United States Patent [19]

Lemercier

[11] 4,022,657
[45] May 10, 1977

[54] DEVICE FOR THE THERMAL PROTECTION OF A FAST REACTOR VESSEL

[75] Inventor: Guy Lemercier, Le Puy Ste-Reparade, France

[73] Assignee: Commissariat a l'Energie Atomique, Paris, France

[22] Filed: July 10, 1975

[21] Appl. No.: 594,644

[30] Foreign Application Priority Data

Aug. 30, 1974 France .............................. 74.29651

[52] U.S. Cl. .................................. 176/40; 176/65; 176/87; 52/224; 52/248; 52/675
[51] Int. Cl.² ...................................... G21C 11/08
[58] Field of Search ........... 176/40, 65, 87; 52/224, 52/248, 249, 673–675

[56] References Cited

UNITED STATES PATENTS

| 3,236,300 | 2/1966 | Chave et al. | 176/87 X |
| 3,357,890 | 12/1967 | Friis et al. | 176/87 X |
| 3,362,567 | 1/1968 | Rudock | 176/87 X |
| 3,548,931 | 12/1970 | Germer et al. | 176/87 X |
| 3,640,032 | 2/1972 | Jubb | 52/224 X |
| 3,764,468 | 10/1973 | Hind | 176/87 X |
| 3,830,695 | 8/1974 | Sauvage | 176/65 X |

Primary Examiner—Samuel W. Engle
Assistant Examiner—Peter A. Nelson
Attorney, Agent, or Firm—Cameron, Kerkam, Sutton, Stowell & Stowell

[57] ABSTRACT

A thermal protection device which prevents the formation of neutral gas thermosiphons within the annular space formed between a reactor vessel wall and the shell of a top closure structure from which the vessel wall is suspended essentially consists of one or a number of packing rings fitted and compressed within the annular space, each ring being made up of a series of elements placed in adjacent relation at the periphery of the closure structure.

8 Claims, 3 Drawing Figures

DEVICE FOR THE THERMAL PROTECTION OF A FAST REACTOR VESSEL

This invention relates to a device for the thermal protection of a fast reactor vessel and especially the top portion of this latter in the region of an annular space provided between the lateral cylindrical wall of said vessel and an oppositely-placed shell forming part of a horizontal top shield structure which closes the reactor vessel, said vessel being embedded in the closure structure and suspended from the end portion of the vessel wall or bond strake.

It is known that the core of a fast reactor is carried in accordance with conventional practice on a support grid mounted within a cylindrical vessel having a vertical axis and containing a suitable volume of liquid metal which serves to cool the reactor core and usually consists of sodium. This coolant is circulated continuously by means of pumps and is heated as it passes through the reactor core, with the result that the heat thus gained is transferred to heat exchangers which are placed within the reactor vessel. The pumps and the heat exchangers are carried by a top horizontal shield slab which closes the reactor vessel and are provided with connections in suitable penetrations through said slab. The peripheral portion of the shield slab rests on an external shield structure which surrounds the reactor vessel and is formed especially of concrete, said reactor vessel being suspended from its upper extremity which is embedded in the thickness of the shield slab. It is also known that said shield slab is usually provided at the level of the reactor vessel with a projecting portion which penetrates into said vessel to a slight extent beneath the level of its anchorage in the remainder of the slab. Said projecting portion is delimited laterally by a cylindrical metallic shell which is coaxial with the reactor vessel and delimits with the opposite wall of this latter an annular space which is necessary in order to take into account dimensional variations arising from temperature variations between the reactor vessel wall and the shell of the shield slab. Said annular space also facilitates the assembly of the shield slab on the reactor vessel and anchoring of the bond strake of said vessel.

In point of fact, an annular space of this type which is normally in contact with a neutral-gas atmosphere and especially argon located above the level of liquid metal within the reactor vessel beneath the shield slab gives rise to substantial thermal gradients since the slab is maintained at a relatively low temperature whilst the reactor vessel wall is on the contrary brought to an intermediate temperature between that of the sodium within the vessel and that of the slab in which the bond strake is embedded. In consequence, the neutral gas has a tendency to circulate within said space as a result of a thermosiphon effect, thus increasing the temperature differences in the vicinity of the bond strake and impairing the mechanical strength of this latter within the anchoring zone.

This invention relates to a thermal protection device which prevents the formation of neutral gas thermosiphons within the annular space formed between the reactor vessel wall and the shield slab shell.

To this end, the device under consideration is essentially constituted by at least one ring fitted and compressed within the annular space between the shield slab shell and the opposite reactor vessel wall, said ring being shell and the opposite reactor vessel wall, said ring being made up of a series of elements placed in adjacent relation at the periphery of the shield slab.

In accordance with one particular feature, the device is made up of a plurality of rings extending in horizontal planes and superposed vertically within the annular space. As an advantageous feature, the elements in each ring are juxtaposed along the length of the ring, the junction zones of the elements in one ring being displaced with respect to the junction zones in the superposed ring.

Depending on requirements, the elements are constituted by sectors of a torus or by substantially parallelepipedal blocks.

In a preferred embodiment of the invention, each sector of a torus is constituted by a wire fabric element, the lateral edges of which are joined together so as to constitute a cylinder having a substantially circular cross-section, the interior of which is packed with compacted stainless steel wool. The extremities of the cylinder of each sector are advantageously closed by a disc of wire fabric, the edges of the wire fabric element and the discs which close the extremities of the cylinders being sewn or clipped together. Finally and in another alternative embodiment, each element is constituted by a stack of superposed wire fabric elements enclosed between two half-casings engaged one inside the other.

Further characteristic features of a thermal protection device in accordance with the invention will become apparent from the following description of one example of construction which is given by way of indication without any limitation being implied, reference being made to the accompanying drawings, in which.

Figure 1:
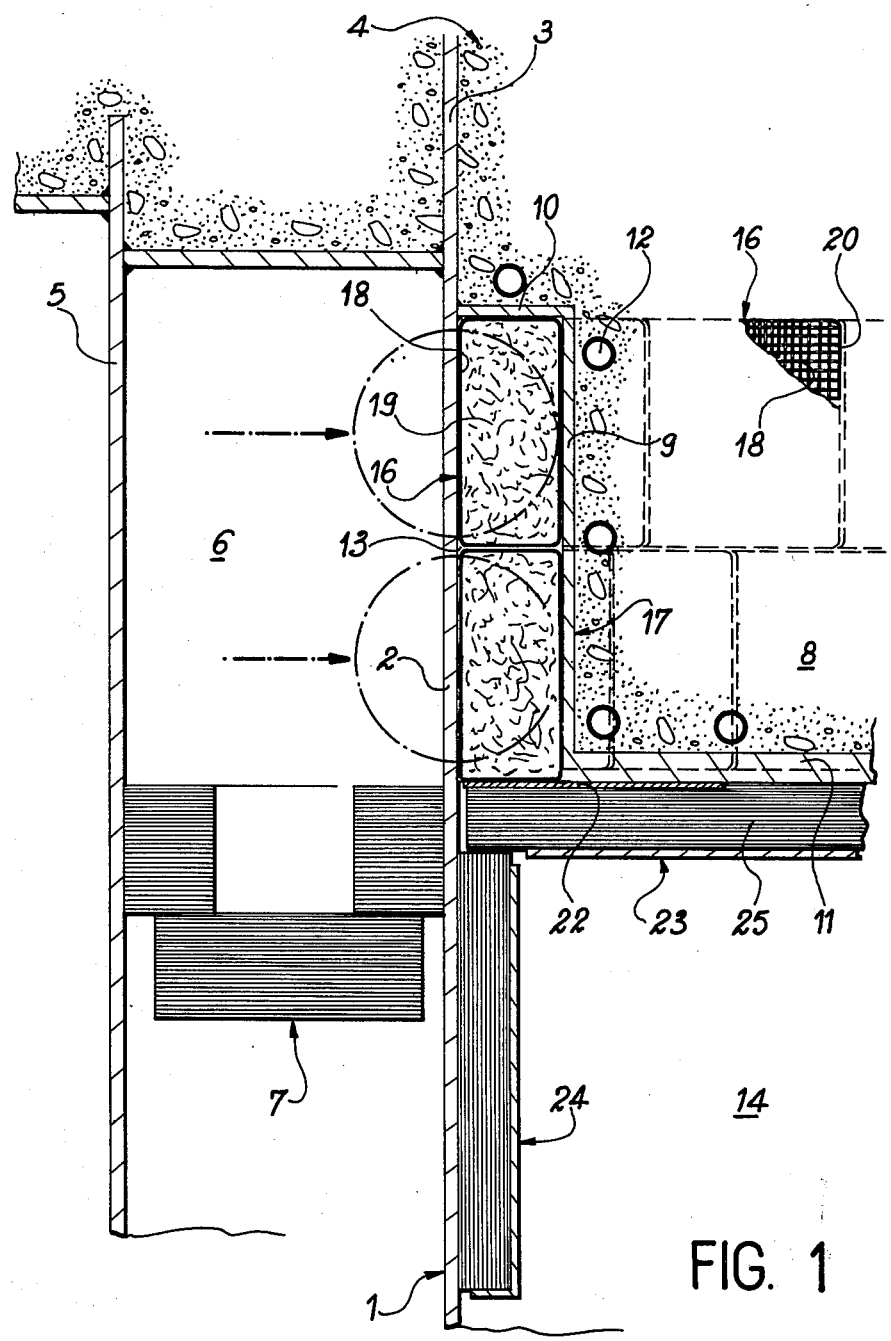
FIG. 1 is a part-sectional diagrammatic view of the upper portion of a fast reactor vessel and of the shield slab which supports said vessel, an annular space being formed between these two elements and the device under consideration being mounted within said space.

In FIG. 1, the reference 1 designates diagrammatically a portion of a fast reactor vessel containing in particular a suitable volume (not shown) of liquid metal which serves to cool the reactor core and usually consists of sodium. Said vessel has a generally cylindrical shape with a vertical axis and is delimited laterally by a metallic wall 2, the upper portion of which, or bond strake 3, serves to suspend the reactor vessel from a horizontal top shield slab 4 which is constructed of concrete in particular. Said shield slab closes the reactor vessel and ensures protection of the environment against radioactive radiations emanating from the reactor core. In accordance with a conventional arrangement, the reactor vessel or so-called primary vessel 1 is surrounded by a second vessel or so-called leak-jacket 5 which is placed externally in coaxial relation with the primary vessel and the top portion of which is also embedded in concrete and suspended beneath the shield slab 4. The vessels 1 and 5 define a space 6 which is filled with a neutral gas usually consisting of nitrogen, the upper portion of said space 6 being isolated from the lower portion by a heat-insulation and closure structure 7, the constructional detail of which has little bearing on the present invention.

That portion of the shield slab 4 which is located above the reactor vessel 1 is provided with a central projecting portion 8 which penetrates substantially into the interior of said vessel beneath the level of anchorage of the bond strake 3 of said vessel. Said projecting portion 8 is delimited laterally by a cylindrical shell 9 which is coaxial with the wall 2 of the vessel 1, said shell being so designed as to terminate in a flat horizontal top flange-plate 10 which is rigidly fixed to the wall 2 whilst said shell 9 is joined at the lower end to a sole-plate 11 which is fixed beneath the shield slab itself. Ducts 12 which are embedded in the shield slab are formed in the thickness of this latter and especially in the portion 8 located in the vicinity of the sole-plate 11 and the shell 9. There is circulated through said ducts a suitable coolant liquid which makes it possible at the time of operation of the reactor to maintain the slab at a relatively low mean temperature of the order of 40° C, for example.

The practical arrangements indicated in the foregoing make it necessary to delimit an annular space 13 between the upper portion of the wall 2 of the vessel 1 prior to anchoring of the vessel bond strake 3 and the shell 9 of the portion 8 of the shield slab. The space is normally in communication with the region 14 which is located within the interior of the reactor vessel 1 above the level of the liquid metal coolant. The annular space 13 aforesaid is delimited on one side by the shell 9 of the shield slab which is maintained at a relatively low temperature and on the other side by the wall 2 of the reactor vessel which is brought to an intermediate temperature between that of the sodium contained therein and that of the bond strake 3 which is embedded in the shield slab. A convective flow of the neutral gas contained within the vessel above the liquid metal is thus developed within the annular space by thermosiphon effect. This effect is highly detrimental to the good mechanical strength of the anchorage of the bond strake 3 within the shield slab, especially as a result of the thermal gradients created within the vessel wall 2.

Figure 2:
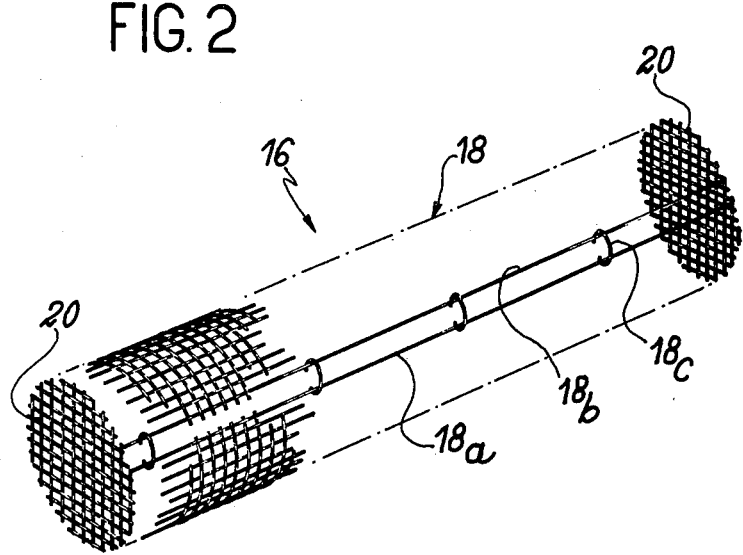
FIG. 2 is a partial view in perspective showing the sector of a torus which is employed in the construction of an alternative embodiment of said device.

In accordance with the invention, the creation of thermosiphon processes of this type within the annular space 13 is prevented by mounting thermal protection elements within these latter. Said elements are designed in the form of superposed rings, each ring in turn formed by a series of juxtaposed elements having the shape of sectors of tori in the example under consideration. As shown in the FIGURE, the annular space 13 is thus fitted with two rings 16 and 17 respectively in which each sector of a torus (the shape of which is illustrated in FIG. 2) is delimited externally by a fine mesh wire fabric 18 which is completely closed so as to constitute an element having a generally cylindrical shape, the edges 18a and 18b of said wire fabric element being joined together by means of clips 18c. The interior of each cylindrical sector thus formed is then filled with a packing of stainless steel wool 19 which has been suitably compacted so as to obtain in particular a density in the vicinity of 1.5. The extremities of the sectors are then closed by means of discs 20 which are also made of wire fabric and either fastened by clips or sewn. These sectors are mounted within the annular space 13, then juxtaposed so as to constitute the rings 16 and 17, the arrangement of the different sectors being chosen so as to ensure that the zones of junction of one sector to the next in the element 17, for example, are suitably displaced with respect to the corresponding zones in the superposed element 16.

Prior to assembly, the rings 16 and 17 together with their juxtaposed elements have a substantially circular cross-section. After assembly, these sectors are suitably deformed so as to occupy zones having substantially rectangular cross-sections within the space 13.

Figure 3:
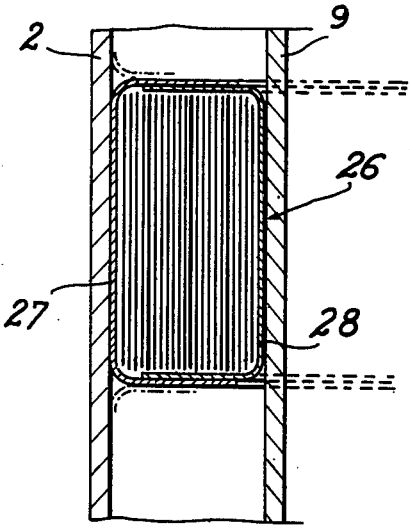
FIG. 3 is a part-sectional view of an alternative embodiment.

The bottom portion of the rings 16 and 17 which have been mounted within the space 13 rests on a support plate 22 which is attached to the sole-plate 11 of the shield slab. Finally, heat-insulating elements such as the elements 23 and 24 constituted by a metallic mat 25 can be disposed beneath said support plate 22, respectively beneath the sole-plate 11 and against the wall 2 of the reactor vessel 1. Said heat-insulating elements can advantageously be in accordance with the arrangements described and illustrated in U.S. Pats. Nos. 3,945,887 and 3,945,165. FIG. 3 further illustrates an alternative form of construction in which the juxtaposed elements constituting the rings mounted between the shell of the shield slab and the vessel bond strake are constituted by substantially parallelepipedal elements which are preferably but not exclusively formed by a stack 26 of wire fabric layers enclosed within an assembly constituted by two half-casings 27 and 28 which are engaged one inside the other, this arrangement being more especially contemplated in the aforesaid U.S. Pat. No. 3,945,165.

There is thus formed a particularly effective thermal protection device which essentially consists in filling the annular space between the reactor vessel wall and the shield slab shell with a simple insulating structure which can readily be assembled and disassembled. Said structure makes it possible to maintain the reactor vessel wall at a relatively uniform temperature and especially to protect the mechanical connection between said wall and the shield slab. The particular design of the rings employed in which provision is made for a packing of stainless steel wool or a mat formed of wire fabric layers makes it possible in addition to satisfy the conditions which call for the presence of the annular space itself and in particular the possibilities of differential expansions between the reactor vessel and the shield slab.

It will be readily apparent that the invention is not limited to the example of construction which has been more especially described with reference to the accompanying drawings but extends on the contrary to all alternative forms.

What we claim is:

1. A device for the thermal protection of the top portion of a fast reactor vessel from a heated neutral gas therein said vessel having a lateral cylindrical vessel wall, an oppositely-placed shell from said wall forming part of a horizontal top shield structure which closes the reactor vessel, an annular space between said wall and said shell said vessel being embedded in said shield structure and suspended from the end portion of the vessel wall at a bond strake, comprising at least one ring fitted and compressed within said annular space between said shield slab shell and said opposite reactor vessel wall, said ring including a plurality of elements in adjacent relation at the periphery of said shield slab, said elements forming a plurality of rings extending in horizontal planes and superposed vertically within the annular space.

2. A protection device according to claim 1, wherein the elements in each ring are a stack of wire fabric elements and two half-casings engaged one inside the other enclosing said elements.

3. A protection device according to claim 1, wherein the elements in said rings are juxtaposed along the length of the ring, the junction zone of the elements in one ring being displaced with respect to the junction zones in the superposed ring.

4. A protection device according to claim 1, wherein the elements in said rings are sectors of a torus.

5. A protection device according to claim 1, wherein said elements in said rings are substantially parallelepipedal blocks.

6. A protection device according to claim 4, wherein said sectors of a torus are a wire fabric element whose lateral edges are joined together to form a cylinder having a substantially circular cross-section and compacted stainless steel wool in said cylinder.

7. A protection device according to claim 6, including a disk of wire fabric closing the extremities of the cylinder of each sector.

8. A protection device according to claim 7, including means for forming the edges of the wire fabric element and the disks which close the extremities of the cylinders.

* * * * *